United States Patent [19]
Horn et al.

[11] Patent Number: 6,109,702
[45] Date of Patent: Aug. 29, 2000

[54] METHOD AND DEVICE FOR CONTROLLING THE BRAKING SYSTEM OF A VEHICLE

[75] Inventors: Matthias Horn, Hardheim; Hans Veil, Eberdingen, both of Germany

[73] Assignee: Bobert Bosch GmbH, Stuttgart, Germany

[21] Appl. No.: 09/143,234

[22] Filed: Aug. 28, 1998

[30] Foreign Application Priority Data

Sep. 11, 1997 [DE] Germany ............................. 197 39 825

[51] Int. Cl.$^7$ ................................ B60T 8/18; B60T 13/10
[52] U.S. Cl. ................................................................ 303/7
[58] Field of Search .................................. 303/3, 7, 9.61, 303/15, 9.62, 22.1, 22.4, 123, 124; 188/112 R

[56] References Cited

U.S. PATENT DOCUMENTS

| | | |
|---|---|---|
| 4,060,284 | 11/1977 | Steiner . |
| 5,411,322 | 5/1995 | Breen . |
| 5,588,716 | 12/1996 | Stumpe ........................................ 303/7 |
| 5,669,678 | 9/1997 | Stumpe et al. ........................... 303/155 |
| 5,702,163 | 12/1997 | Stumpe .................................. 303/9.62 |
| 5,720,534 | 2/1998 | Stumpe .................................... 303/166 |
| 5,738,418 | 4/1998 | Stumpe et al. ......................... 303/9.61 |
| 5,806,938 | 9/1998 | Stumpe et al. ........................... 303/155 |
| 5,927,822 | 7/1999 | Hart ............................................ 303/7 |
| 6,012,781 | 1/2000 | Gerum ........................................ 303/7 |
| 6,022,084 | 2/2000 | Horn et al. ................................. 303/7 |

FOREIGN PATENT DOCUMENTS

| | | |
|---|---|---|
| 0 575 936 | 12/1993 | European Pat. Off. . |
| 39 11 253 | 6/1990 | Germany . |
| 41 12 845 | 10/1992 | Germany . |
| 41 32 506 | 1/1993 | Germany . |
| 42 43 245 | 6/1994 | Germany . |
| 195 21 872 | 12/1996 | Germany . |
| 196 48 936 | 5/1998 | Germany . |

OTHER PUBLICATIONS

Wrede et al., "Brake by Wire for Commerical Vehicles," Nov. 16–19, 1992, SAE Technical Paper Series 922489. Described in the specification of the above–identified application.

*Primary Examiner*—Chris Schwartz
*Attorney, Agent, or Firm*—Kenyon & Kenyon

[57] ABSTRACT

A method and a device for controlling the braking system of a vehicle that includes at least two subvehicles. In this context, at least one of these subvehicles is provided with an electrically controllable braking system. A correcting quantity is determined from operating variables of the first subvehicle for influencing the longitudinal forces between the vehicle sections during a braking process. The correcting quantity is determined repeatedly during a braking process, the determination of the correcting quantity being effected more quickly at the beginning of a braking than in the course of the braking process. Furthermore, the correcting quantity is determined in such a way that the ratio of braking force to normal force in both subvehicles is essentially adjusted to the same value.

16 Claims, 4 Drawing Sheets

METHOD AND DEVICE FOR CONTROLLING THE BRAKING SYSTEM OF A VEHICLE

FIELD OF THE INVENTION

The present invention relates to a method and a device for controlling the braking system of a vehicle.

BACKGROUND INFORMATION

The publication, SAE Paper 92 24 89, "Brake by Wire for Commercial Vehicles", describes an electrically regulated braking system for a vehicle, in which the braking system of a trailer or semitrailer can be controlled in an open or closed loop via a suitable interface. In such vehicle combinations, the forces occurring between the subvehicles, especially in the longitudinal direction when braking the vehicle combination are of particular importance, since they can influence travel comfort and safety. The goal of the open or closed loop control of the braking systems of such a vehicle combination is to minimize these forces. It has been found that different brake hystereses of the subvehicles, i.e. different application and release of the brakes of the subvehicles, contribute considerably to the occurrence of longitudinal forces during the braking process. Therefore, in the past, conventional devices sought to determine the application and/or release of the brakes of the subvehicles.

Thus, for example, German Application No. 41 12 845 A1 describes a compressed-air braking system in which the application and the associated controlled variable of the individual wheel brakes are determined by analyzing the time-related pressure characteristic in response to a brake actuation. Furthermore, German Application No. 195 218 72 describes a procedure according to which the application and/or release of the brakes of the trailer and semitrailer, respectively, can be determined by identification in response to braking-force build-up and braking-force reduction. Such measures make it possible to derive the controlled variables to be preset for the application and/or release of the wheel brakes of the subvehicles of a vehicle combination.

Taking these variables into account in the control of the braking systems contributes to considerable improvement in the braking performance. Using conventional methods, the longitudinal forces between the vehicle sections of a vehicle combination can be effectively controlled and reduced. However, the procedure in conventional methods require too much effort, and a relatively long time is needed until reliable results of the identification are available.

An object of the present invention is to specify measures, by which the longitudinal forces between the subvehicles of a vehicle combination can be minimized quickly and reliably.

SUMMARY OF THE INVENTION

A design approach according to the present invention ensures a very rapid adjustment of a vehicle combination, with a view to minimizing the longitudinal forces between the vehicle sections.

It is particularly advantageous that this is achieved with sufficient accuracy, and the longitudinal forces between the vehicle sections of a vehicle combination can be satisfactorily reduced.

In an advantageous manner, it also becomes possible to combine towing vehicles having electronically regulated compressed-air brakes, with trailers or semitrailers having a conventional pneumatic braking system. Even given such vehicle combinations, a uniform braking-force distribution between the towing vehicle and the trailer and semitrailer, respectively, a uniform wear and tear, and a uniform heating of the brake linings in the two subvehicles, as well as satisfactory travel comfort are achieved due to the design approach according to the present invention. These advantages result for other combinations as well, e.g. when the towing vehicle and the trailer and semitrailer, respectively, have electrically controllable braking systems.

Another advantage is that, very quickly after the start of travel, a correction for the control of the trailer braking system is already determined, with whose aid the different hysteresis characteristics of the subvehicles are largely equalized, and the longitudinal forces between the subvehicles are minimized.

It is particularly advantageous that the correcting quantity for correcting the control of the braking system along the lines of a reduction in the longitudinal forces is formed more quickly at the beginning of a braking process than in the course of the braking process. Because of this, quickly after the start of the braking process, a correcting quantity is available whose accuracy is improved during the braking process by longer measuring times.

DETAILED DESCRIPTION

Figure 1:
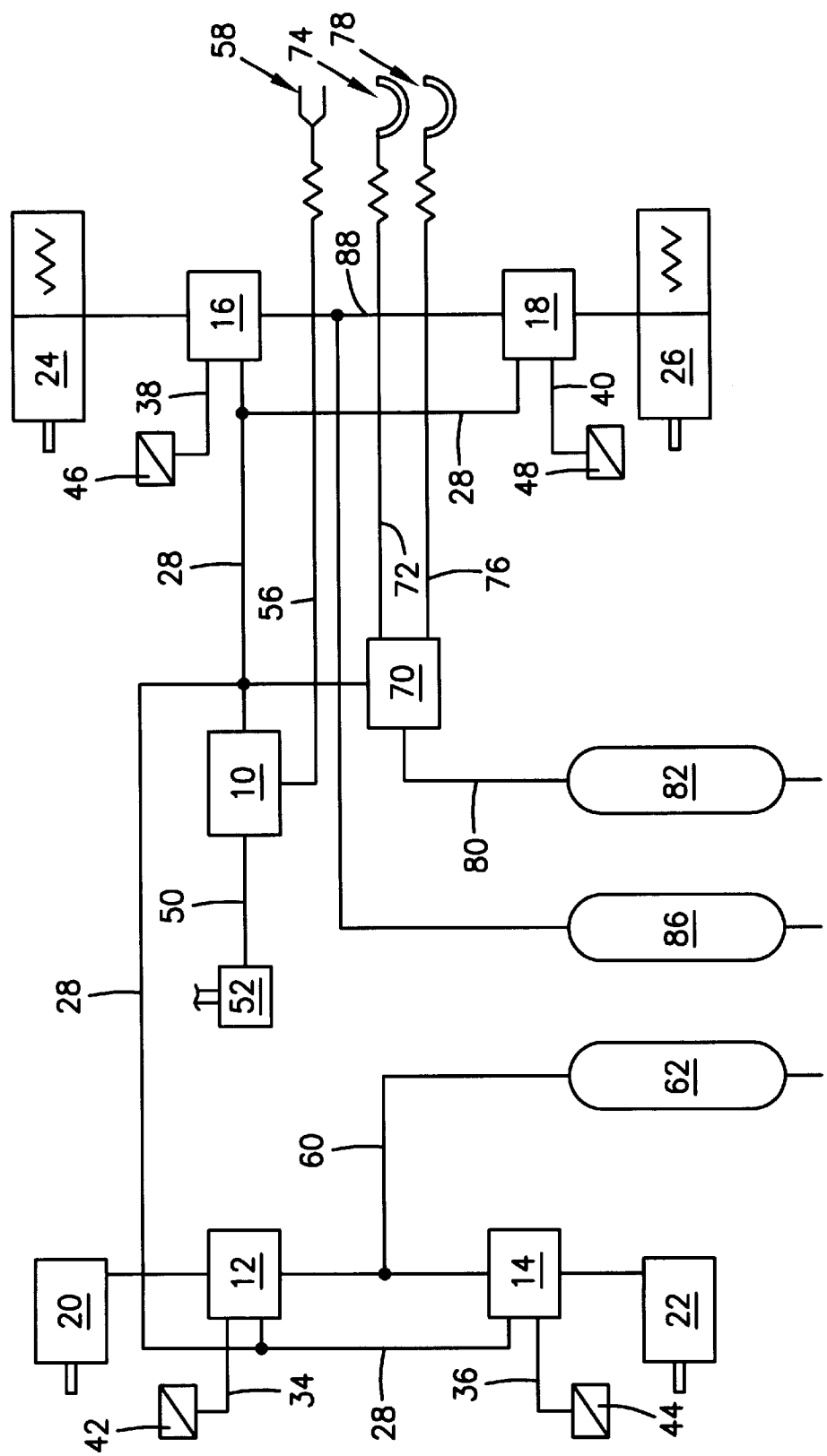
FIG. 1 shows an electropneumatic braking system of a towing vehicle of a vehicle combination.

FIG. 1 shows an overview block diagram of an electronically regulated braking system, using as an example an electronically regulated compressed-air braking system for a two-axle towing vehicle with trailer connection.

FIG. 1 shows a central control unit 10, which has at least one microcomputer. Provision is also made decentrally for "pressure-control modules" 12, 14, 16 and 18, which in each case are allocated to a wheel brake 20, 22, 24, and 26 of the towing vehicle. Central control unit 10 is connected to pressure-control modules 12 to 18 via a communication system 28, e.g. CAN. To detect the input brake pressures and to determine wheel speeds and the axle load at at least one axle (e.g. by pressure sensors in the air bellows), as well as, optionally, other variables such as brake temperatures, etc., lines 34, 36, 38 and 40 from corresponding measuring devices 42, 44, 46 and 48 are connected in each case to pressure-control modules 12 to 18. Moreover, central control unit 10 is connected via a line 50 to a braking valuator device 52. In addition, to control a trailer braking system, provision is made for a trailer control module 70 which is connected to central control unit 10 via communication system 28. In this context, provision is made in the area of trailer control module 70 for at least one pressure sensor, not shown in FIG. 1, which detects the pressure in the pneumatic control line to the trailer. In addition, a line 56 runs from central control unit 10, to electrical plug-in connection 58 to the trailer.

In a preferred exemplary embodiment, the pneumatic part of the braking system, which optionally has a secondary braking circuit, not shown in FIG. 1, for the pneumatic actuation of the wheel brakes, is composed of three supply reservoirs 62, 82 and 86. Pressure-control modules 12 and 14, allocated to wheel brakes 20 and 22 of the front axle, are provided via lines 60 with a supply pressure coming from supply reservoir 62. Trailer control module 70 is connected via a line 80 to supply-pressure reservoir 82. A pneumatic control line 72 runs from trailer control module 70 to a first coupling head 74, and a supply line 76 runs to a second coupling head 78. Pressure-control modules 16 and 18, which are allocated to wheel brakes 24 and 26 of the rear axle of the towing vehicle, are provided with supply pressure from supply reservoir 86 via a line 88.

In the preferred exemplary embodiment, a measure for the actuating intensity of the brake pedal is supplied to central control unit 10 from braking valuator device 52. In the central control device, this signal is processed and from it, possibly in view of further operating variables (such as axle loads, vehicle deceleration, etc.), setpoint pressure-, setpoint braking torque-, setpoint force- or setpoint slippage-values are determined for the individual wheel brakes and for the trailer, respectively, according to predefined characteristic curves or engine characteristics maps. These setpoint values are fed via communication system 28 to the individual pressure-control modules and to the trailer control module, which adjust the pressure in the individual wheel brakes and the control line to the braking system of the trailer according to the setpoint input.

Figure 2:
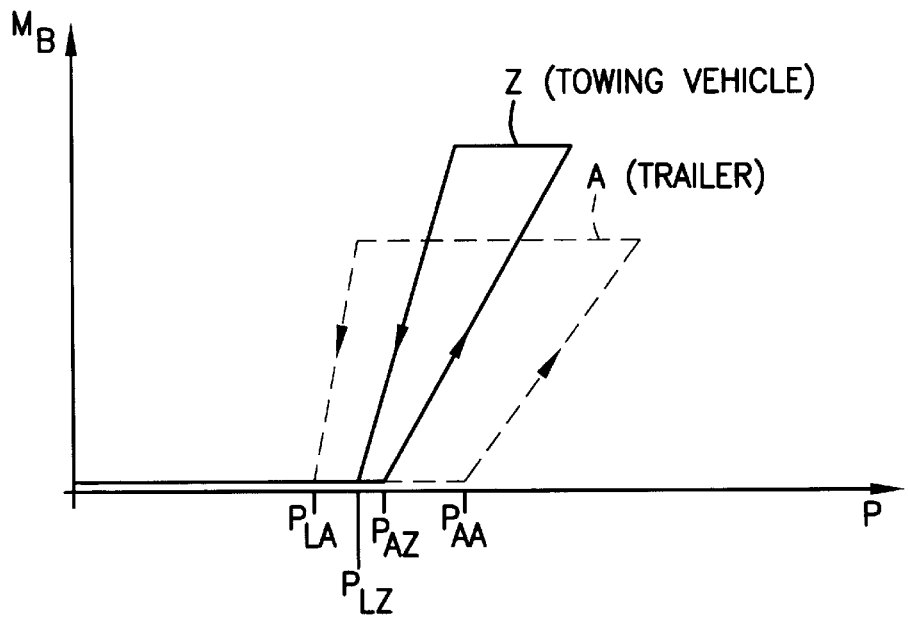
FIG. 2 shows exemplary braking hystereses for a vehicle combination.

Generally, the individual wheel brakes are applied at different points of time, and are released again at different points of time. This holds true especially for the wheel brakes of the towing vehicle, and those of the trailer, which are applied or released in response to different brake-pressure values. This means that, during a braking process, the braking action at the individual subvehicles occurs at different points of time. A corresponding behavior can be observed after completing the braking process, during the release of the brakes. At the same time, the two subvehicles also have different braking hystereses. A typical example is shown in FIG. 2, where in a braking torque/braking pressure diagram, the braking hysteresis of a towing vehicle is plotted with solid lines, and the braking hysteresis of a trailer or semitrailer is plotted with a broken line. In this context, the application pressures of the trailer and of the semitrailer, respectively, and of the towing vehicle are represented by PAA and PAZ, while PLZ and PLA designate the corresponding release pressures of the towing vehicle and of the trailer and semitrailer, respectively.

To compensate for the different braking characteristics of the subvehicles, and to minimize the longitudinal forces acting between these subvehicles, provision is made for a braking compensation, which adjusts the ratio of the braking force to the normal force in both subvehicles to, let us say, the same value. The root idea of the following described compensating method is that the ratio of the braking force to the normal force is determined for the towing vehicle from the known and stored measuring data, and the trailer braking system is controlled in such a way that the corresponding ratio in the trailer and semitrailer, respectively, adjusts itself essentially to the ratio preset by the towing vehicle. It has been found that this is the case when the deceleration of the entire vehicle combination is equal to the ratio of the braking force to the normal force of the towing vehicle.

During the braking process, with the aid of a simple braking model, the braking force of the towing vehicle is determined according to the following equation:

$$Bz = c1*(p1-pa1) - c2*(p2-pa2) \qquad (1)$$

where:
$Bz$ is the braking force at the towing vehicle,
$c1$ is the characteristic braking value of the front axle of the towing vehicle,
$c2$ is the characteristic braking value of the rear axle of the towing vehicle,
$p1$ is the braking pressure of the front axle of the towing vehicle,
$p2$ is the braking pressure of the rear axle of the towing vehicle,
$pa1$ is the application pressure of the brakes of the front axle of the towing vehicle, and
$pa2$ is the application pressure of the brakes of the rear axle of the towing vehicle.

Either the corresponding values (brake pressure, application pressure, characteristic braking value) of selected wheels or wheel brakes of the corresponding axles, or average values of the single values, may be used for the respective axle. For example, the application pressures of the front-axle and rear-axle brakes of the towing vehicle were determined using a method known to those skilled in the art.

The entire static axle load Nz (normal force towing-vehicle wheels) of the towing vehicle is determined from axle-load sensors before the start of the braking. In the case of semitrailer towing vehicles, the sensor already present at the rear axle of the towing vehicle, which determines axle load N2 of the rear axle, is sufficient for this purpose. Axle load N1 of the front axle is determined using the following simple approximation:

$$N1 = N10 + k*(N2-N20) \qquad (2)$$

where:
N10 is the axle load at the front axle of the towing vehicle in the unladen state (i.e. without semi-trailer),
N20 is the axle load at the rear axle of the towing vehicle in the unladen state (i.e. without semi-trailer),
k is a constant, as a function of the wheel base of the towing vehicle and of the position of the saddle plate, and
N2 is the axle load (measured) at the rear axle of the towing vehicle.

The dynamic axle-load shift from the semi-trailer to the towing vehicle occurring during a braking process in a double road train can be disregarded in the case of most brakings occurring where the deceleration is less than 0.15 g.

The sum of axle loads N1 and N2 of the front and rear axle then forms total axle load Nz of the towing vehicle.

$$Nz = N1 + N2 \qquad (3)$$

Thus, the ratio of braking force Bz to normal force Nz for the towing vehicle is determined from equations 1 and 3. In the case of a braking compensation according to the present invention, this ratio is adjusted to be essentially identical in both subvehicles:

$$Bz/Nz = Ba/Na \qquad (4)$$

where:

Ba is braking force semitrailer/trailer, and
Na is normal force semitrailer/trailer - wheels.

This is the case, when deceleration $z=-\ddot{x}/g$ ($\ddot{x}$: 2. time derivation of the path; z: deceleration; g: gravitational acceleration) of the entire vehicle equals the ratio of braking force to normal force for the towing vehicle. Following from this is a very simple method for implementing the braking compensation.

First of all, the ratio of the braking force to the normal force for the towing vehicle is calculated according to the above-named equations. Then the actual deceleration z of the entire vehicle is determined from the wheel-speed signals of the towing vehicle. A deceleration caused by the down-grade force is taken into account, in that before the start of braking, a deceleration offset value zoff is determined which is subtracted from the deceleration determined during the braking (z=z-zoff). Next, the system deviation dz is calculated by formation of the difference between the ratio of braking force Bz to normal force Nz for the towing vehicle, and measured deceleration z:

$$dz = Bz/Nz - z \qquad (5)$$

This system deviation is integrated over a specific period of time ΔT to form a velocity deviation dv:

$$dv = 1/\Delta T * \int_{\Delta T} dz * dt \qquad (6)$$

Correction value Δpk, used for controlling the trailer or semitrailer braking system, is raised or reduced as a function of the calculated velocity deviation. If velocity deviation dv is greater than a predefined minimum value dvmin, pressure offset value Δpk is increased. This is effected either by incrementing by a specific amount, by a variable amount, or by increasing the pressure offset value as a function of the extent threshold value dvmin is exceeded. In a corresponding manner, pressure offset Δpk is reduced by velocity deviation dv in response to an undershoot of negative threshold value −dvmin. The braking pressure in the coupling head to the trailer and semitrailer, respectively, is then corrected by adding pressure offset value Δpk.

At the beginning of travel, the duration of integration ΔT is selected to be as short as possible to permit a rapid compensation (typically, ΔT=1 sec.). After a few brakings, it is advisable to increase ΔT stepwise. In this manner, the adjusted pressure offset stabilizes, and the vehicle performance is improved.

The method described assumes the knowledge of characteristic braking values c1 and c2 of the towing vehicle. These can be determined in advance and are assumed to be constant. The possible change of these characteristic values over the service life of the vehicle is optionally ascertained by a suitable estimation method (compare, e.g., German Application No. 196 48 936.9).

During the measuring process, it is also advantageous to prevent the braking by the retarding brake (retarder). Alternatively, the deceleration additionally caused by the retarding brake (when known) is taken into account, analogous to offset value zoff, when determining the deceleration.

In the preferred exemplary embodiment, provision is made for a pressure sensor in the coupling head to the trailer and semitrailer, respectively, as well as for a control device, electrically influenceable by the wheel brake, for controlling the pressure to the trailer and semitrailer. In the exemplary embodiments in which such elements are not provided, a correction value does not act upon the pressure to the trailer and semitrailer, respectively, but rather the brake pressure of the towing vehicle is corrected by the negative correction value.

Knowledge of the road gradient is just as unnecessary for implementing the described procedure as measuring signals from the trailer or semitrailer.

Figure 3:
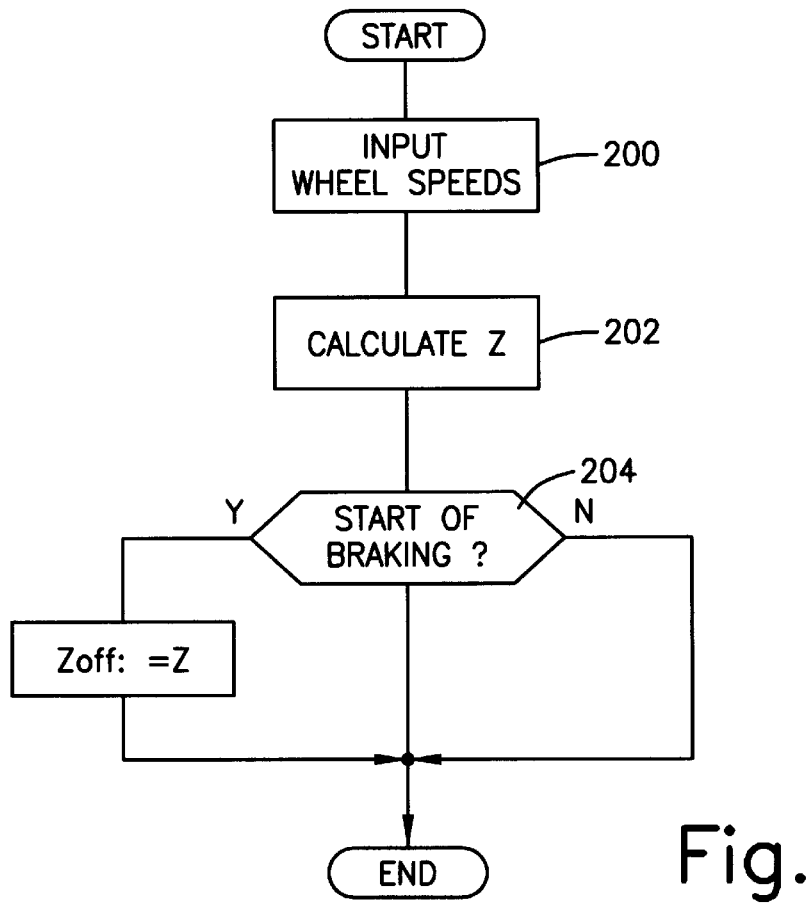
FIG. 3 shows a flow chart which sketches a program used for calculating the deceleration.
Figure 4:
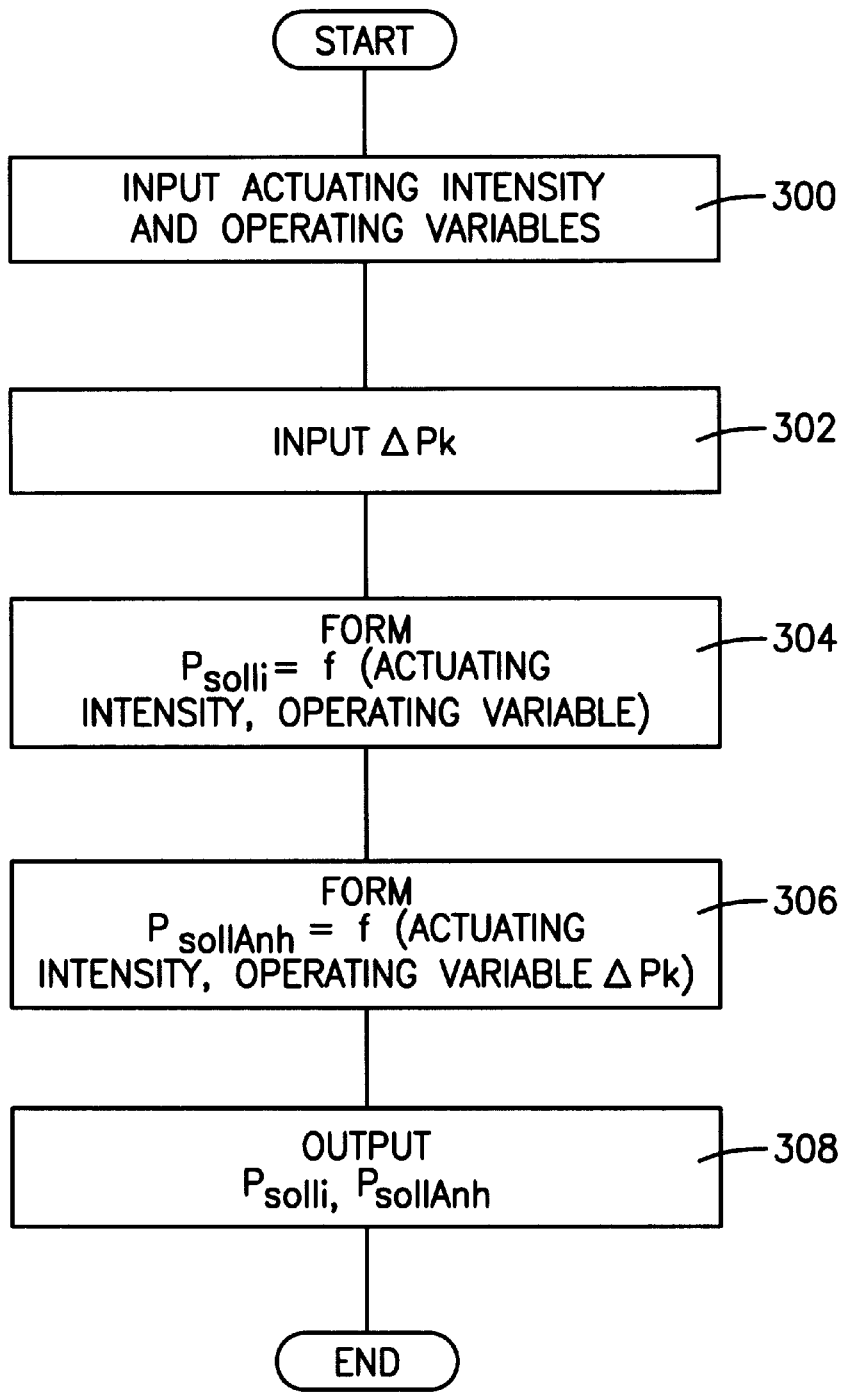
FIG. 4 shows a flow chart of a program for correcting the control pressure supplied to the trailer and semitrailer, respectively, for adjusting the entire vehicle combination.
Figure 5:
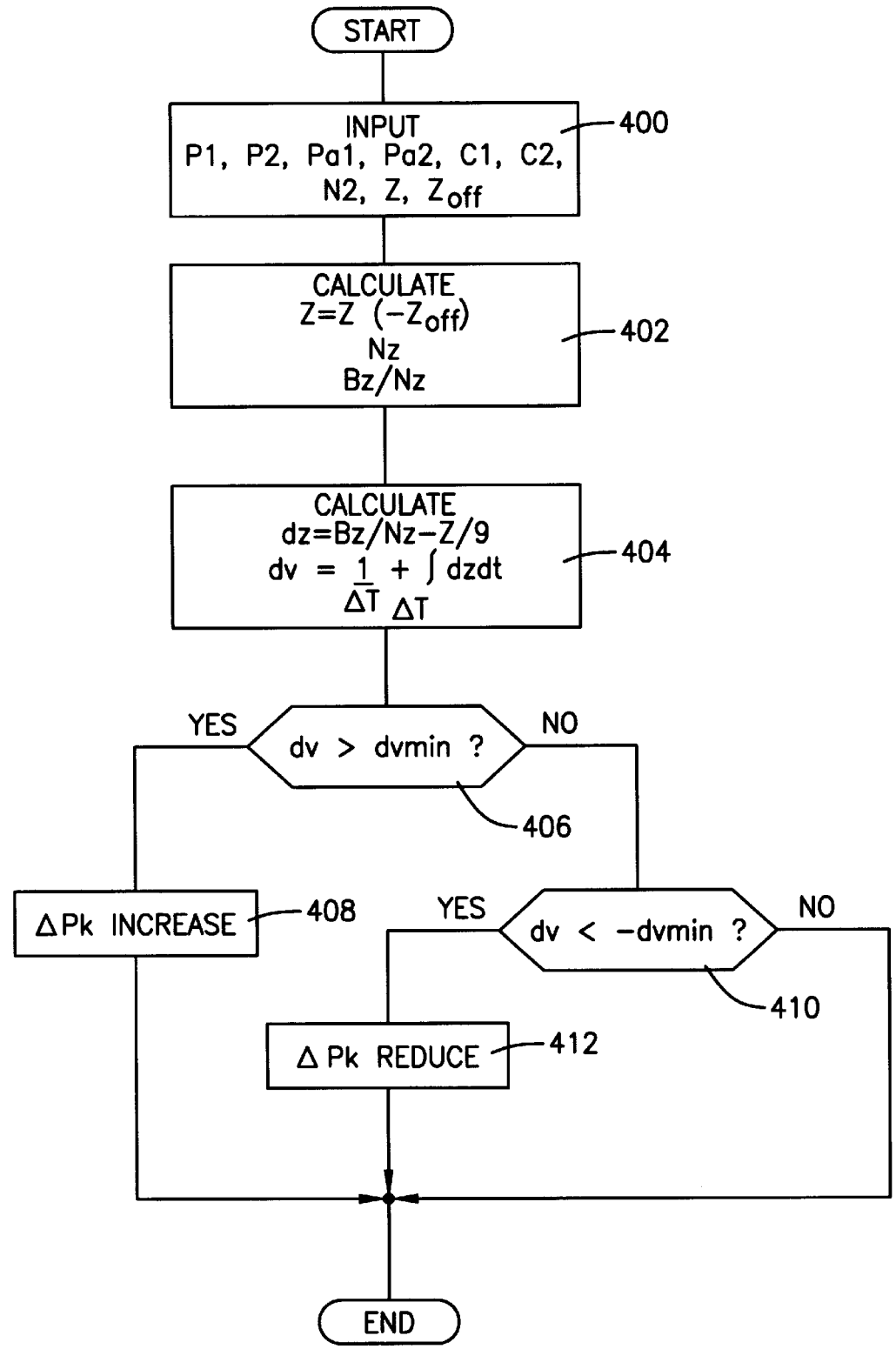
FIG. 5 shows a flow chart of a program for determining this correction during a braking process, using data from the towing vehicle.

FIGS. 3–5 show a preferred exemplary embodiment of the described procedure using flow charts.

The program sketched in FIG. 3 starts at predefined points of time with a first step 200, in which the wheel speeds of the towing vehicle are input. In the following step 202, deceleration z of the vehicle combination is determined from these wheel speeds by conventional methods (e.g. comparison of the average value of the wheel speeds of the non-driven wheels to the average value from a previous program run). In the following interrogation step 204, it is checked whether the start of a braking process exists, i.e. whether the driver has just actuated the brake pedal. If this is the case, according to step 206, deceleration z, calculated in step 202, is stored as deceleration zoff, and the program is ended, as in the case of a no response in step 204. The program is then repeated outside of, and during a braking process at predefined points of time for calculating the vehicle deceleration, step 206 being run through only given a first actuation of the brake pedal, not in the case of an actuated brake pedal. Given active retarders, the deceleration produced by the retarder is contained in zoff.

The flow chart depicted in FIG. 4 shows the control of the braking system, taking into account the variable offset value Δpk. The described program part is initiated at predefined points of time, the actuating intensity of the brake pedal, as well as the operating variables, such as axle-load values, used for forming the setpoint values, being input in first step 300. In the following step 302, offset value Δpk, determined within the framework of the subsequently described identification and stored for the trailer, is input. In the next step 304, setpoint values $P_{solli}$ for the wheel brakes of the towing vehicle are formed on the basis of the actuating intensity of the brake pedal, of the application pressures, as well as, optionally, of the input operating variables, according to predefined characteristic curves or engine characteristics maps. In the following step 306, pressure setpoint value $P_{sollanh}$ for the trailer and for the semitrailer, respectively, is then formed as a function of the actuating intensity of the brake pedal, of the input offset value Δpk, and, optionally, of operating variables, on the basis of engine characteristics maps or characteristic curves. In this context, in a preferred exemplary embodiment, the offset value is added to the setpoint value, set as a function of the actuating intensity and, optionally, of operating variables. In the following step 308, the determined setpoint values are output to the control devices (pressure-control modules, trailer-control module), the program part is ended, and is repeated at a predefined time.

FIG. 5 shows a flow chart which is used to determine the increase or lowering of the correction factor. The program part is introduced during a braking process at predefined points of time.

The variables necessary for calculating the velocity deviation are input in the first step 400. They are the front-axle brake pressure p1, rear-axle brake pressure p2, application pressure of front axle pa1, application pressure of rear axle pa2, characteristic braking values c1 and c2, axle load at rear axle N2, deceleration z of the vehicle combination, as well as, optionally, offset deceleration Zoff. In the following step 402, deceleration z, normal force Nz of the towing vehicle, and the ratio of braking force Bz to normal force Nz of the towing vehicle are then determined according to the preceding equations. In the next step 404, system deviation dz is then determined by subtraction of the ratios of braking force to normal force, and deceleration to g, and this system deviation is integrated over an integration interval ΔT for the velocity deviation dv. In the following step 406, velocity deviation dv is compared to limiting value dvmin. If the velocity deviation is greater than the limiting value, correction value Δpk is raised according to step 408. If the velocity deviation is less than the limiting value, it is checked in step 410, whether the velocity deviation lies below negative limiting value –dvmin. If this is the case, correction value Δpk is lowered according to step 412. If velocity deviation dv lies between the positive and negative value of limiting value dvmin, the program part is ended and repeated at a predefined time, without correction value Δpk having been changed.

Besides the use in the case of electropneumatic braking systems, the described procedure is also used for electrohydraulic and electromotive braking systems, respectively, where particularly in the case of the latter, the corresponding variables (instead of brake pressure, braking force/braking torque) can be used.

To summarize, it can be stated that, according to the present invention, the correcting quantity is determined repeatedly during a braking process, the correcting quantity being determined more quickly at the start of a braking than in the course of the braking process.

In another exemplary embodiment, integration interval ΔT is increased with increasing total braking time, i.e. at the start of travel, ΔT is small (fast adjustment), after several brakings, ΔT becomes larger (slow adjustment).

According to the present invention, the correcting quantity is determined on the basis of the deviation of the deceleration of the entire vehicle, from a standard value formed as a function of the exerted braking force and the active normal force of the first subvehicle. In other words, the correcting quantity is determined in such a way that the ratio of the braking force to normal force is essentially equal in the two subvehicles.

What is claimed is:

1. A method for controlling a braking system of a vehicle including a first subvehicle and a second subvehicle, the first subvehicle having an electrically controlled braking system for adjusting a first braking force for at least one wheel of the first subvehicle and a second braking force for the second subvehicle as a function of a driver's braking command, the first subvehicle further having at least one operating variable, the method comprising the steps of:

determining at least one correcting quantity as a function of the at least one operating variable of the first subvehicle; and adjusting at least one of the first braking force for the first subvehicle and the second braking force for the second subvehicle as a function of the at least one correcting quantity, the adjustment influencing a longitudinal force between the first subvehicle and the second subvehicle during a braking process, wherein the at least one correcting quantity is repeatedly determined during the braking process, wherein the at least one correcting quantity-is determined at a first rate at a beginning of the braking process, wherein the at least one correcting quantity is determined at a second rate after at least one of a predefined period of time and a predefined number of brakings, and wherein the second rate is less than the first rate.

2. A method for controlling a braking system of a vehicle including a first subvehicle and a second subvehicle, the first subvehicle having an electrically controlled braking system for adjusting a first braking force for at least one wheel of the first subvehicle and a second braking force for the second subvehicle as a function of a driver's braking command, the first subvehicle further having at least one operating variable, the method comprising the steps of:

determining at least one correcting quantity as a function of the at least one operating variable of the first subvehicle;

adjusting at least one of the first braking force for the first subvehicle and the second braking force for the second subvehicle as a function of the at least one correcting quantity, the adjustment influencing a longitudinal force between the first subvehicle and the second subvehicle during a braking process; and determining a standard value as a function of an exerted braking force and an active normal force of the first subvehicle, wherein the at least one correcting quantity is determined as a further function of a deviation of a deceleration of the vehicle and the standard value.

3. A method for controlling a braking system of a vehicle including a first subvehicle and a second subvehicle, the first subvehicle having an electrically controlled braking system for adjusting a first braking force for at least one wheel of the first subvehicle and a second braking force for the second subvehicle as a function of a driver's braking command, the first subvehicle further having at least one operating variable, the method comprising the steps of:

determining at least one correcting quantity as a function of the at least one operating variable of the first subvehicle; and adjusting at least one of the first braking force for the first subvehicle and the second braking force for the second subvehicle as a function of the at least one correcting quantity, the adjustment influencing a longitudinal force between the first subvehicle and the second subvehicle during a braking process, wherein the correcting quantity is determined so that a first ratio of the first braking force and a first normal force of the first subvehicle is substantially equal to a second ratio of the second braking force and a second normal force of the second subvehicle.

4. The method according to claim 1, the method further comprising the step of:

determining a first braking force as a function of at least one of a plurality of measured brake-pressure value and a plurality of braking-force values according to a braking model.

5. The method according to claim 1, wherein the first subvehicle includes at least one axle, the method further comprising the step of:

calculating a normal force of the first subvehicle as a function of a measured axle load of the at least one axle of the first subvehicle.

6. The method according to claim 1, the method further comprising the step of:

determining a deceleration of the vehicle during the braking process.

7. The method according to claim 1, wherein the vehicle travels along a road having a road gradient, the method further comprising the step of:

determining a deceleration of the vehicle during the braking process as a function of the road gradient of the road.

8. The method according to claim 1, the method further comprising the steps of:

determining a first ratio between a braking force and a normal force of the first subvehicle;

determining a difference between the first ratio and a deceleration of the vehicle as a function of a gravitational acceleration.

9. The method according to claim 8, the method further comprising the step of:

determining a velocity deviation of the vehicle as a function of a system deviation of the vehicle.

10. The method according to claim 8, the method further comprising the step of:

determining a velocity deviation of the vehicle as a function of an integration of a system deviation of the vehicle.

11. The method according to claim 9, the method further comprising the step of:

increasing the correcting quantity if the velocity deviation of the vehicle is greater than a predetermined minimal change; and decreasing the correcting quantity if the velocity deviation of the vehicle is smaller than a predetermined value.

12. The method according to claim 10, wherein a duration of the integration of the system deviation varies during the braking process, wherein the duration of the integration is a predetermined smallest interval at the beginning of the braking process, and wherein the duration of the integration increases as a function of at least one of a passage of time and an increasing number of braking processes.

13. The method according to claim 10, wherein a duration of the integration of the system deviation varies during the braking process, wherein the duration of the integration is a predetermined small interval at a beginning of a driving cycle, and wherein the duration of the integration increases as a function of at least one of a passage of time and an increasing number of braking processes.

14. A device for controlling a braking system of a vehicle including a first subvehicle and a second subvehicle, the first subvehicle having an electrically controllable braking system, the device comprising:

a control unit receiving a driver's braking command, adjusting a first braking force for the first subvehicle as a function of the driver's braking command and determining at least one correcting quantity; and means for correcting at least one of the first braking force for the first subvehicle and a second braking force for the second subvehicle as a function of the at least one correcting quantity, the correction influencing a longitudinal force between the first and second subvehicles, wherein the control unit repeatedly determines the at least one correcting quantity during the braking process, wherein the at least one correcting quantity is determined at a first rate at a beginning of the braking process, wherein the at least one correcting quantity is determined at a second rate after at least one of a predefined period of time and a predefined number of brakings, and wherein the second rate is less than the first rate.

15. A device for controlling a braking system of a vehicle including a first subvehicle and a second subvehicle, the first subvehicle having an electrically controllable braking system, the device comprising:

a control unit receiving a driver's braking command, adjusting a first braking force for the first subvehicle as a function of the driver's braking command and determining at least one correcting quantity; and means for correcting at least one of the first braking force for the first subvehicle and a second braking force for the second subvehicle as a function of the at least one correcting quantity, the correction influencing a longitudinal force between the first and second subvehicles, wherein the control unit determines a standard value as a function of an exerted braking force and an active normal force of the first subvehicle, and wherein the control unit determines the at least one correcting quantity as a function of a deviation of a deceleration of the vehicle from the standard value.

16. A device for controlling a braking system of a vehicle including a first subvehicle and a second subvehicle, the first subvehicle having an electrically controllable braking system, the device comprising:

a control unit receiving a driver's braking command, adjusting a first braking force for the first subvehicle as a function of the driver's braking command and determining at least one correcting quantity; and means for correcting at least one of the first braking force for the first subvehicle and a second braking force for the second subvehicle as a function of the at least one correcting quantity, the correction influencing a longitudinal force between the first and second subvehicles, wherein the control unit determines the at least one correcting quantity so that a first ratio of the first braking force and a first normal force for the first subvehicle is substantially equal to a second ratio of the second braking force and a second normal force for the second subvehicle.

* * * * *